(12) United States Patent
Kim

(10) Patent No.: US 6,241,307 B1
(45) Date of Patent: Jun. 5, 2001

(54) TAILGATE STRUCTURE FOR AUTOMOTIVE VEHICLE AND MANUFACTURING METHOD THEREOF

(75) Inventor: Ki-Chang Kim, Suwon (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 09/576,578

(22) Filed: May 22, 2000

(30) Foreign Application Priority Data

Nov. 17, 1999 (KR) .................................................. 99-51012

(51) Int. Cl.$^7$ ...................................................... B60J 5/02
(52) U.S. Cl. ..................................... 296/146.8; 296/146.5; 296/76; 296/56; 296/106; 49/502; 52/656.5
(58) Field of Search .................... 296/76, 146.8, 296/146.5, 56, 106; 52/656.5, 656.6; 49/502

(56) References Cited

U.S. PATENT DOCUMENTS

| | | | |
|---|---|---|---|
| 4,206,944 | * | 6/1980 | Kumagai et al. ..................... 296/76 |
| 4,275,915 | * | 6/1981 | Koritnok ............................... 296/76 |
| 4,413,854 | * | 11/1983 | Hirshberg ............................. 296/76 |
| 4,664,437 | * | 5/1987 | Queveau ............................... 296/76 |
| 4,799,730 | * | 1/1989 | Harasaki ........................... 296/146.8 |
| 4,822,098 | * | 4/1989 | Vigt et al. ............................. 296/76 |
| 6,015,182 | * | 1/2000 | Weissert et al. .................. 296/146.8 |
| 6,039,384 | * | 3/2000 | Schutle ............................. 296/146.5 |
| 6,053,562 | * | 4/2000 | Bednarski ......................... 296/146.8 |

\* cited by examiner

*Primary Examiner*—Joseph D. Pape
*Assistant Examiner*—Kiran B. Patel
(74) *Attorney, Agent, or Firm*—Christie, Parker & Hale, LLP

(57) ABSTRACT

A tailgate structure for automotive vehicle and manufacturing method thereof adapted to join an inner panel of a tailgate via a plurality of panels each having a different thickness by way of laser welding, thereby ruling out waste of materials, preventing concentration of stress through uniformity of joined areas and promoting a reinforcement of structural strength at respective members, the tailgate having an inner panel centrally forming an opening, an outer panel coupled to the inner panel to centrally form an opening and a door glass installed on the openings of the inner panel and the outer panel, wherein the inner panel comprises lateral members having a relatively heavy thickness and corresponding to left and right portions of the opening; and upper and lower members vertically connecting the lateral members and each having a relatively thinner in thickness thereof than those of the lateral members.

2 Claims, 4 Drawing Sheets

TAILGATE STRUCTURE FOR AUTOMOTIVE VEHICLE AND MANUFACTURING METHOD THEREOF

BACKGROUND OF THE INVENTION

1. Field of the Invention

The present invention relates to a tailgate of an automotive vehicle, and more particularly to a tailgate structure for automotive vehicle and manufacturing method thereof adapted to change a tailgate structure for reduction of manufacturing cost and for shortened manufacturing process.

2. Description of the Prior Art

Generally, a tailgate 10 mounted at a rear end of a passenger car, openable/closeable for accommodation of various freights, is hinged at an upper end thereof to a rear tip end of a roof panel 2 of a body 1 of an automotive vehicle (hereinafter referred to as vehicle body), such that the tailgate 10 is vertically rotated, and opened and closed.

Furthermore, the tailgate 10 includes, as illustrated in FIG. 2, an inner panel 12 centrally cut in rectangular shape and formed with an opening 13, an outer panel 14 centrally formed with an opening 15 to be coupled to the inner panel 12 and a door glass 16 fixedly installed on the openings 13 and 15 of the inner panel 12 and the outer panel 14.

At this locations, the inner panel 12 is coupled at left and right sides thereof with reinforcing panels 18 respectively, where each reinforcing panel 18 is outwardly bent from a hinge point 12a provided for hinge with the roof panel 2 of vehicle body 1 while each hinge point is located on an upper left and right side of the inner panel 12. The reinforcing panel 18 is also extended to a lower corner area 12b of the opening 13 at the inner panel 12 to again be inwardly bent. The reinforcing panel 18 serves to reinforce a structural strength at a part weak to bending force and torsional strength received by the tailgate 10 when the tailgate 10 is opened and closed.

Meanwhile, manufacturing process of the tailgate 10 comprising the inner panel 12, outer panel 14, door glass 16 and the reinforcing panel 18 will be described.

The tailgate 10 is manufactured by the following processes, the processes comprising the steps of: separately manufacturing the inner panel 12, outer panel 14 and reinforcing panel 18 through respective pressing processes; spot-welding and joining the reinforcing panel 18 from upper left/right hinge points 12a of the inner panel 12 to the lower corner area 12b; hemming a marginal area of the outer panel 14 about a marginal area of the inner panel 12 to thereby join with sealant; and assembling the door glass 16 through the openings 13 and 15 of the inner panel 12 and outer panel 14 via a glass molding material (not shown).

However, there is a problem in the tailgate 10 thus manufactured through the above-mentioned processes in that the opening 13 is formed through a steel panel cut in approximate rectangular shape in the forming of the inner panel 12 out of the press-utilized forming processes to thereby result in an unnecessary waste as much as the cut portion (generally called as scrap).

There is another problem in that the tailgate 10 is lengthily extended from a hinge point 12a of the inner panel 12 to the lower corner area 12b of the opening 13, such that the reinforcing panel 18 is additionally joined for structural strength reinforcement of the tailgate 10, thereby increasing the manufacturing cost due to additional consumption of raw material and assembly processes.

There is still another problem in that the reinforcing panel 18 joined from the upper left/right points 12a to the lower corner are 12b of the inner panel 12 is spot-welded for coupling, such that a general spot welding generates a concentration of stress to a junction part and brings forth a weakness of welding strength around the junction part, thereby deteriorating durability of the tailgate 10.

SUMMARY OF THE INVENTION

The present invention is disclosed to solve the aforementioned problems and it is an object of the present invention to provide a tailgate structure for automotive vehicle and manufacturing method thereof adapted to cut an inner panel of a tailgate into a plurality of different thickness of fragmentary panels to join same by way of laser welding to thereby eliminate waste of necessary raw material.

It is another object of the present invention to provide a tailgate structure for automotive vehicle and manufacturing method thereof adapted to prevent a concentration of stress by way of uniformality of joined part and to promote reinforcement of structural strength for raw material.

In accordance with the objects of the present invention, there is provided a tailgate structure for automotive vehicle and manufacture method thereof, the tailgate having an inner panel centrally forming an opening, an outer panel coupled to the inner panel to centrally form an opening and a door glass installed on the openings of the inner panel and the outer panel, wherein the inner panel comprises lateral members having a relatively heavy thickness and corresponding to left and right portions of the opening; and upper and lower members vertically connecting the lateral members and each having a relatively thinner in thickness thereof than those of the lateral members.

BRIEF DESCRIPTION OF THE DRAWINGS

For fuller understanding of the nature and objects of the invention, reference should be made to the following detailed description taken in conjunction with the accompanying drawings in which.

DETAILED DESCRIPTION OF THE INVENTION

Embodiment of the present invention will now be described in detail with reference to the accompanying drawings.

Figure 3:
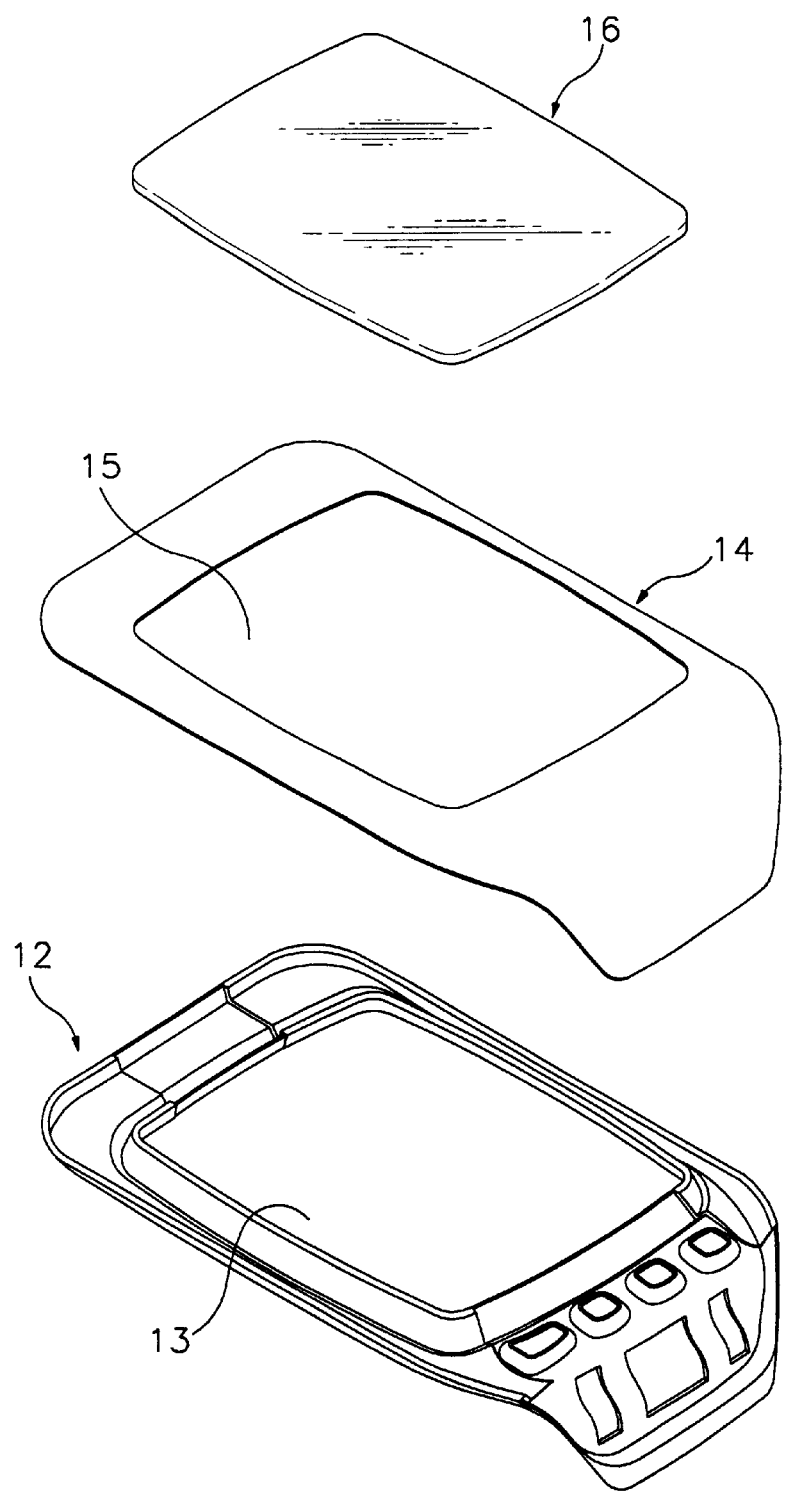
FIG. 3 is an exploded perspective view for illustrating structural elements of a tailgate according to the present invention.

A tailgate of an automotive vehicle according to the present invention includes, as illustrated in FIG. 3, an inner panel 12, an outer panel 14 and a door glass 16 installed at openings 13 and 15 respectively formed at the inner panel 12 and the outer panel 14 via glass molding material (not shown).

Figure 4:
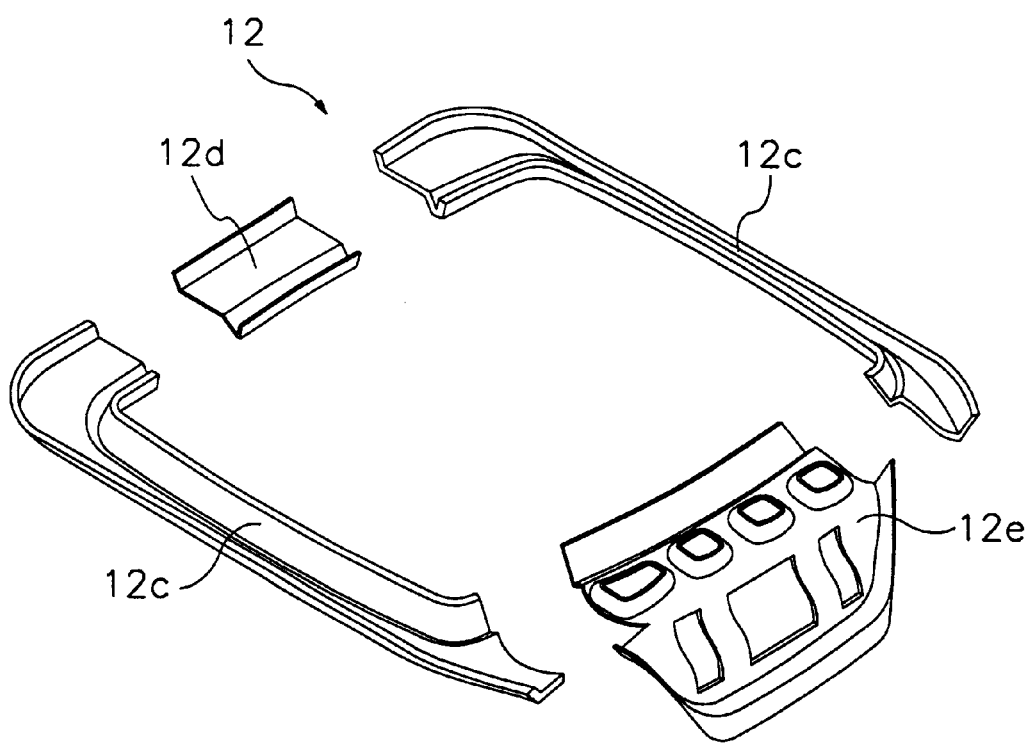
FIG. 4 is an exploded perspective view for illustrating structural parts of inner panel shown in FIG. 3.

At this location, the inner panel 12 is structured such that a plurality of panels, each having a different thickness, are respectively joined to form an integral shape, where the inner panel 12 includes, as illustrated in FIG. 4, lateral members 12c, each having a relatively heavy thickness and corresponding to a left and right side of the openign 13 centrally formed thereof, and an upper member 12d and a lower member 12e respectively and vertically connecting the lateral member 12c and each having a relatively thinner thickness than that of the lateral member 12c.

Furthermore, the lateral member 12c, upper member 12d and the lower member 12e are made from panel of respectively different thickness by way of cutting through a press forming so called Tailored Welding Blank TWB method, where joint portions of respective members are combined by way of butt joint method and joined by laser welding for integration thereof. The press forming process of TWB method for respectively forming the lateral member 12c, upper member 12d and lower member 12e forming the inner panel 12 is not realized by the conventional method where only central portion of a large panel is cut by a press, but accomplished by sequential method comprising the steps of:

pre-cutting and preparing panels most suitable for sizes of corresponding portions (cutting process); and press-forming the members cut through the cutting process via a metal frame molded to meet specific shapes of each member such as recess, protrusion and the like (forming process).

Figure 1:
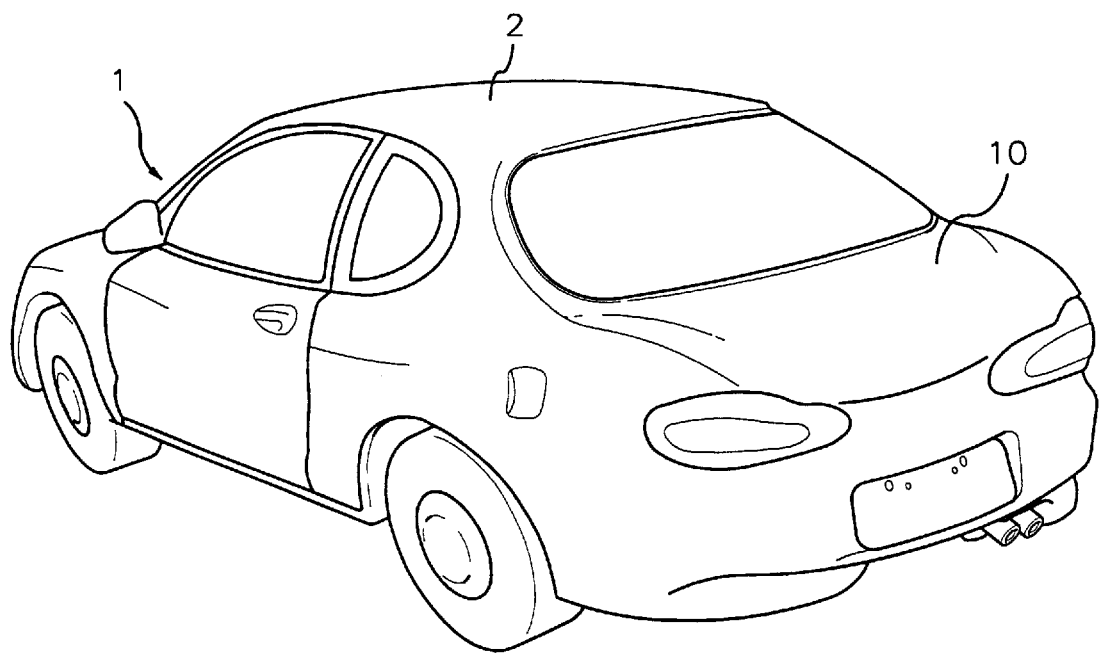
FIG. 1 is a schematic perspective view for illustrating a rear body of an automotive vehicle having a tailgate.
Figure 2:
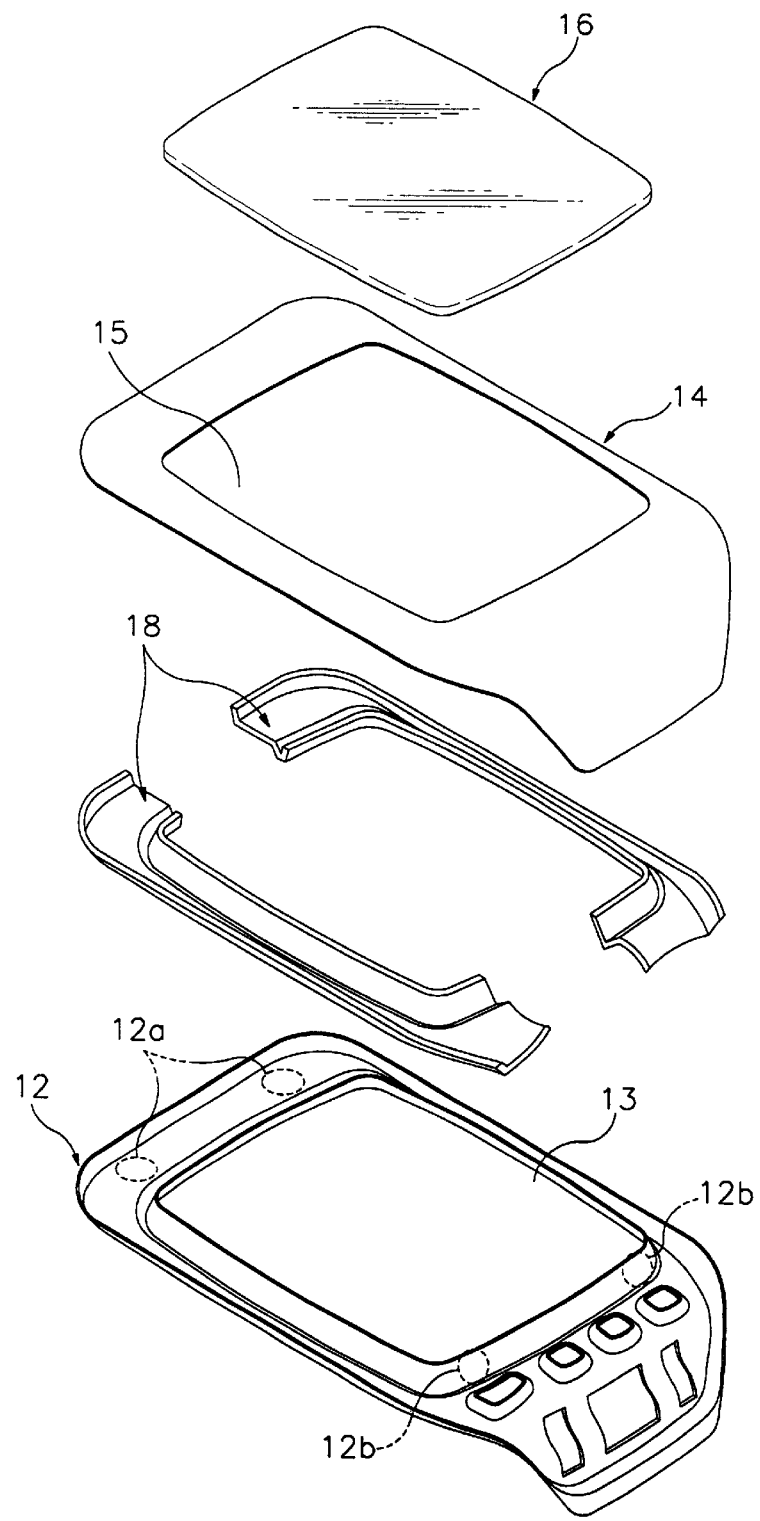
FIG. 2 is an exploded perspective view for illustrating structural elements of a tailgate according to the prior art.

In other words, the lateral member 12c is a member so formed as to be lengthily extended from the upper hinge point area 12a of the conventional inner panel 12 to the lower corner area 12b, as illustrated in FIG. 2, and the upper member 12d is a member so formed as to correspond to upper hinge point area 12a of the conventional inner panel 12 while the lower member 12e is a member so formed as to correspond to an area broadly extended from the lower corner area 12b of the conventional inner panel 12 to a lower side.

The lateral member 12c of the inner panel 12 is relatively thicker in thickness thereof than those of the upper member 12d and the lower member 12e, the reason of which is to perform a same function as that of the reinforcing panel 18 (see FIG. 2) at the conventional inner panel 12 in reinforcement of structural strength of the tailgate 10.

Furthermore, the lateral member 12c, the upper member 12d and the lower member 12e are not overlapped and joined by spot welding at respective joints as in the conventional method but are butted at respective joints which are in turn welded by laser welder, so called welded butt joint method.

In other words, in manufacturing of the inner panel 12 for tailgate 10, the lateral member 12c, upper member 12d and the lower member 12e are respectively press-formed, where, each member is butted and integrated by welding.

Accordingly, unnecessary loss caused by generation of scraps can be eliminated compared with the conventional method where the inner panel 12 is manufactured only by press-forming, such that a separate reinforcing panel 18, so formed as to be extended from the upper hinge point area 12a to the lower corner area 12b after press-forming, is not needed to be coupled to the inner panel 12, thereby shortening the manufacturing process.

Still furthermore, there is an advantage in joining respective seamed areas of the lateral member 12c, the upper member 12d and the lower member 12e by way of laser welding, in that no concentration of stress is generated on respective joined areas due to occurrence of uniform joining across the entire joined area according to characteristic of laser welding, such that no weakness of strength on the joined area occurs even after long period of use.

The lateral member 12c of the inner panel 12 is made of a member relatively thicker in thickness thereof than that of the upper member 12d and the lower member 12e, thereby guaranteeing a structural strength of the tailgate 10.

Now, manufacturing process of the tailgate 10 manufactured via the inner panel 12 formed by joining a plurality of members by way of butt joint method will be described.

The manufacturing process includes the processes of:

individually press-forming respective members 12c, 12d and 12e of the inner panel 12 and the outer panel 14 through respective pressing processes (forming process);

joining the respective members 12c, 12d and 12e of the inner panel 12 by way of laser welding of butt joint method (joining process);

hemming a marginal area of the outer panel 14 around a marginal area of the inner panel 12 to be coupled with sealant (hemming process); and accommodating the door glass 16 on the openings 13 and 15 of the inner panel 12 and the outer panel 14 via a glass molding material (not shown) (assembly process).

As mentioned above the forming process of the inner panel 12 is such that the lateral member 12c, the upper member 12d and the lower member 12e are individually and respectively press-formed, butted and joined by way of laser welding of butt joint method uniformly across the entire joined areas of respective members 12c, 12d and 12e.

As apparent from the foregoing, there is an advantage in the tailgate of automotive vehicle according to the present invention thus described in that the inner panel 12 of the tailgate 10 is formed by a plurality of plates having respectively different thickness being cut and butted by way of butt joint method, thereby eliminating waste of unnecessary materials and promoting a guarantee of structural strength to the members.

There is another advantage in that additional joining utilizing separate members for reinforcing a structural strength to the tailgate 10 is eliminated, thereby promoting to shorten the manufacturing process.

What is claimed is:

1. A tailgate structure for a vehicle, the tailgate having an inner panel centrally forming an opening, an outer panel coupled to the inner panel to centrally form an opening and a door glass installed on the openings of the inner panel and the outer panel, wherein the inner panel comprises lateral members having a relatively heavy thickness and corresponding to left and right portions of the opening; and upper and lower members vertically connecting the lateral members and each having a relatively thinner in thickness than that of the lateral members.

2. The tailgate structure as defined in claim 1, wherein respective tip areas of the lateral members, the upper member and the lower member are joined together by laser butt weld.

* * * * *